US012574724B2

(12) United States Patent
Zhai et al.

(10) Patent No.: US 12,574,724 B2
(45) Date of Patent: Mar. 10, 2026

(54) NETWORK CONNECTION METHOD, TERMINAL, DEVICE TO BE CONNECTED TO NETWORK, AND STORAGE MEDIUM

(71) Applicant: GUANGDONG OPPO MOBILE TELECOMMUNICATIONS CORP., LTD., Dongguan (CN)

(72) Inventors: Zhaoxuan Zhai, Dongguan (CN); Taiyue Wu, Dongguan (CN); Zhigang Yu, Dongguan (CN); Chunliang Zeng, Dongguan (CN); Qichang Yang, Dongguan (CN); Tao Feng, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 600 days.

(21) Appl. No.: 18/148,280

(22) Filed: Dec. 29, 2022

(65) Prior Publication Data

US 2023/0224701 A1     Jul. 13, 2023

Related U.S. Application Data

(63) Continuation of application No. PCT/CN2021/108626, filed on Jul. 27, 2021.

(30) Foreign Application Priority Data

Aug. 31, 2020    (CN) .......................... 202010901291.7

(51) Int. Cl.
*H04M 1/66* (2006.01)
*H04W 12/041* (2021.01)
*H04W 12/0431* (2021.01)

(52) U.S. Cl.
CPC ..... *H04W 12/041* (2021.01); *H04W 12/0431* (2021.01)

(58) Field of Classification Search
CPC ........ H04L 9/0844; H04L 9/08; H04W 12/03; H04W 12/069; H04W 12/50; H04W 12/041; H04W 12/0431
See application file for complete search history.

(56) References Cited

U.S. PATENT DOCUMENTS 10,547,613 B1 * 1/2020 Roths .................... H04L 9/0844
10,764,752 B1 * 9/2020 Avetisov ............. H04L 63/0823
(Continued)

FOREIGN PATENT DOCUMENTS

CN      106533662 A      3/2017
CN      106658504 A      5/2017
(Continued)

OTHER PUBLICATIONS

CNIPA, Notification to Grant Patent Right for Invention for CN Application No. 202010901291.7, Apr. 9, 2023.
(Continued)

*Primary Examiner* — Shantell L Heiber
(74) *Attorney, Agent, or Firm* — Hodgson Russ LLP

(57) ABSTRACT

A network connection method is performed by a terminal, and the method comprises: establishing a pre-connection with a to-be-accessed device, and the to-be-accessed device being a device to access network; generating a first key pair, and sending a first public key In the first key pair to the to-be-accessed device; generating a first shared key based on the first key pair and first key negotiation information corresponding to the to-be-accessed device; encrypting network configuration information of a network device by using the first shared key, to obtain encrypted network configuration information; and sending the encrypted net-
(Continued)

work configuration information to the to-be-accessed device, to allow the to-be-accessed device to decrypt the encrypted network configuration information by a second shared key, and access the network device based on the decrypted network configuration information.

17 Claims, 8 Drawing Sheets

(56) References Cited

U.S. PATENT DOCUMENTS

| | | | | |
|---|---|---|---|---|
| 2012/0082312 A1 | | 4/2012 | Liu et al. | |
| 2015/0229473 A1* | | 8/2015 | Klein | H04L 9/3226 |
| | | | | 713/171 |
| 2017/0250974 A1* | | 8/2017 | Antonyraj | H04W 12/50 |
| 2019/0261168 A1* | | 8/2019 | Shi | H04W 12/35 |
| 2019/0327701 A1* | | 10/2019 | Akiba | H04W 76/30 |

FOREIGN PATENT DOCUMENTS

| | | |
|---|---|---|
| CN | 107426725 A | 12/2017 |
| CN | 107508735 | 12/2017 |
| EP | 2966805 | 1/2016 |
| WO | 2016160256 A1 | 6/2016 |
| WO | 2017108412 A1 | 6/2017 |

OTHER PUBLICATIONS

Hao, "Elliptic Curve J-PAKE Cipher Suites for Transport Layer Security (TLS); draft-cragie-tls-ecjpake-01," tls Internet-Draft, Newcastle University, Jun. 22, 2016.

Hao, "J-Pake: Password-Authenticated Key Exchange by Juggling," Independent Submission, Newcastle University, Sep. 2017.

EPO, Extended European Search Report for EP Application No. 21860019.5, Feb. 2, 2024.

WIPO, International Search Report and Opinion for International Application No. PCT/CN2021/108626, Oct. 26, 2021.

CNIPA, First Office Action for CN Application No. 202010901291. 7, Jul. 1, 2022.

CNIPA, Second Office Action for CN Application No. 202010901291. 7, Dec. 16, 2022.

\* cited by examiner

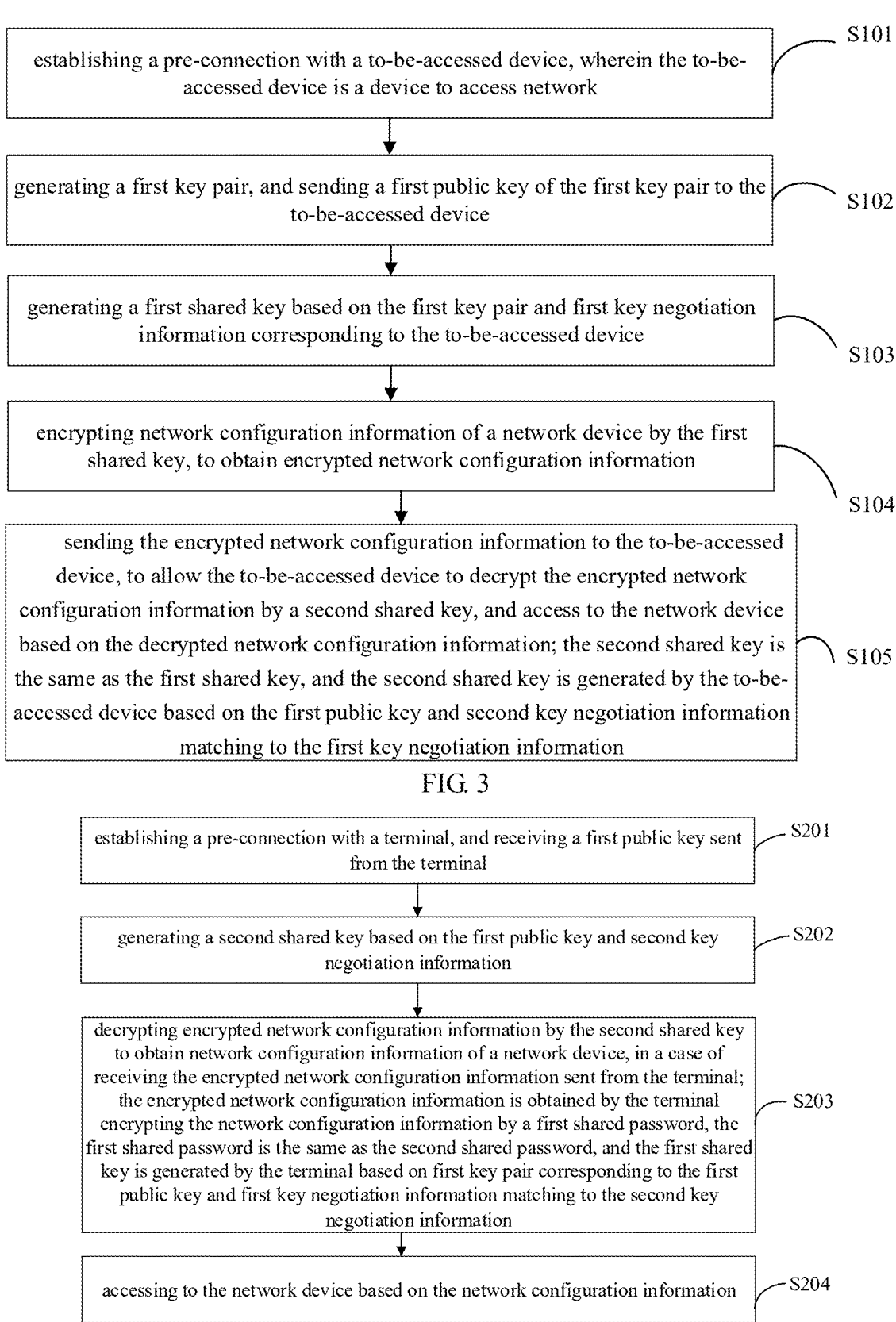

establishing a pre-connection with a to-be-accessed device, wherein the to-be-accessed device is a device to access network    S101 generating a first key pair, and sending a first public key of the first key pair to the to-be-accessed device    S102 generating a first shared key based on the first key pair and first key negotiation information corresponding to the to-be-accessed device    S103 encrypting network configuration information of a network device by the first shared key, to obtain encrypted network configuration information    S104 sending the encrypted network configuration information to the to-be-accessed device, to allow the to-be-accessed device to decrypt the encrypted network configuration information by a second shared key, and access to the network device based on the decrypted network configuration information; the second shared key is the same as the first shared key, and the second shared key is generated by the to-be-accessed device based on the first public key and second key negotiation information matching to the first key negotiation information    S105

FIG. 3 establishing a pre-connection with a terminal, and receiving a first public key sent from the terminal    S201 generating a second shared key based on the first public key and second key negotiation information    S202 decrypting encrypted network configuration information by the second shared key to obtain network configuration information of a network device, in a case of receiving the encrypted network configuration information sent from the terminal; the encrypted network configuration information is obtained by the terminal encrypting the network configuration information by a first shared password, the first shared password is the same as the second shared password, and the first shared key is generated by the terminal based on first key pair corresponding to the first public key and first key negotiation information matching to the second key negotiation information    S203 accessing to the network device based on the network configuration information    S204

FIG. 4

NETWORK CONNECTION METHOD, TERMINAL, DEVICE TO BE CONNECTED TO NETWORK, AND STORAGE MEDIUM

CROSS REFERENCE TO RELATED APPLICATIONS

The present disclosure is a continuation of International Patent Application No. PCT/CN2021/108626 filed on Jul. 27, 2021, which claims priority to Chinese Patent Application No. 202010901291.7, filed on Aug. 31, 2020, the entire disclosures of which are incorporated by reference herein.

TECHNICAL FIELD

The present disclosure relates to the field of communications and in particular to a network connection method and a terminal.

RELATED ART

An existing process of a terminal being connected to a WiFi hotspot of a to-be-accessed device includes: the to-be-accessed device opening the WiFi hotspot after powered on; the terminal searching for the WiFi hotspot and establishing a pre-connection with the to-be-accessed device; and the terminal sending network configuration information such as a WiFi name, and a WiFi password to the to-be-accessed device, and the to-be-accessed device achieving network connection based on the network configuration information.

However, according to the existing network connection method, in a process of the terminal transmitting the network configuration information to the to-be-accessed device, the network configuration information may be acquired by an attacker and configured to hack into user network and steal the privacy of the user, and a problem of the network connection having a low security may be caused.

SUMMARY OF THE DISCLOSURE

A network connection method and a terminal are provided in the embodiments of the present disclosure.

A first network connection method is provided and performed by a terminal, wherein the method comprises establishing a pre-connection with a to-be-accessed device to the network, wherein the to-be-accessed device is a device to access network; generating a first key pair, and sending a first public key of the first key pair to the to-be-accessed device; generating a first shared key based on the first key pair and first key negotiation information corresponding to the to-be-accessed device; encrypting network configuration information of a network device by the first shared key, to obtain encrypted network configuration information; and sending the encrypted network configuration information to the to-be-accessed device, to allow the to-be-accessed device to decrypt the encrypted network configuration information by a second shared key, and access to the network device based on the decrypted network configuration information; wherein the second shared key is the same as the first shared key, and the second shared key is generated by the to-be-accessed device based on the first public key and second key negotiation information matching to the first key negotiation information.

A second network connection method is provided and performed by a to-be-accessed device, wherein the to-be-accessed device is a device to access a network, and the method comprises establishing a pre-connection with a terminal, and receiving a first public key sent from the terminal; generating a second shared key based on the first public key and second key negotiation information; decrypting encrypted network configuration information by the second shared key to obtain network configuration information of a network device, in a case of receiving the encrypted network configuration information sent from the terminal; wherein the encrypted network configuration information is obtained by the terminal encrypting the network configuration information by a first shared key, the first shared key is the same as the second shared key, and the first shared key is generated by the terminal based on first key pair corresponding to the first public key and first key negotiation information matching to the second key negotiation information; and accessing to the network device based on the network configuration information.

The embodiments of the present disclosure provide a terminal, and the terminal comprises a first processor; a first transmitter; a first receiver; a first memory; and a first communication bus; wherein when the first processor executes a program stored in the first memory, the first processor is caused to implement the above first network connection method.

BRIEF DESCRIPTION OF THE DRAWINGS

FIG. 3 is a flowchart one of a network connection method according to some embodiments of the present disclosure.

FIG. 4 is a flowchart two of a network connection method according to some embodiments of the present disclosure.

DETAILED DESCRIPTION

Figure 1:
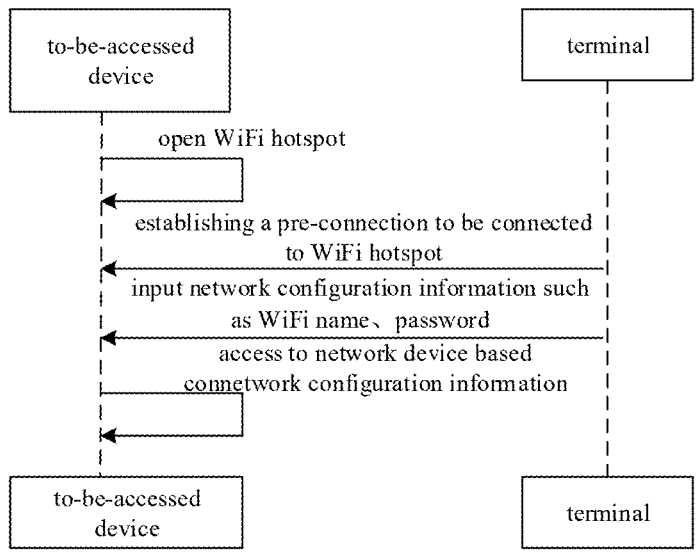
FIG. 1 is a schematic view of an interaction in which a terminal is connected to a WiFi hotspot of a to-be-accessed device.

In a first aspect, a network connection method is provided in the embodiments of the present disclosure and is performed by a terminal. The method includes establishing a pre-connection with a to-be-accessed device, the to-beaccessed device being a device to access network; generating a first key pair, and sending a first public key of the first key pair to the to-be-accessed device; generating a first shared key based on the first key pair and first key negotiation information corresponding to the to-be-accessed device; encrypting network configuration information of a network device by the first shared key, to obtain encrypted network configuration information; and sending the encrypted network configuration information to the to-be-accessed device, to allow the to-be-accessed device to decrypt the encrypted network configuration information by a second shared key, and access to the network device based on the decrypted network configuration information. The second shared key is the same as the first shared key, and the second shared key is generated by the to-be-accessed device based on the first public key and second key negotiation information matching to the first key negotiation information.

In some embodiments, the first key negotiation information is a preset public key, and the generating a first shared key based on the first key pair and the first key negotiation information corresponding to the to-be-accessed device includes processing a first private key of the first key pair and the preset public key by a first encryption algorithm to generate the first shared key.

In some embodiments, the first key negotiation information is a preset public key, and before the generating a first shared key based on the first key pair and the first key negotiation information corresponding to the to-be-accessed device, the method further includes receiving a second public key sent from the to-be-accessed device, the second public key being a public key of a second key pair generated by the to-be-accessed device; receiving signature information sent from the to-be-accessed device, and verifying the signature information by the preset public key, the first public key, and the second public key. The signature information is obtained by the to-be-accessed device signing the first public key and the second public key with a preset private key, and the preset private key is a second key negotiation message matching to the preset public key.

In some embodiments, the generating a first shared key based on the first key pair and the first key negotiation information corresponding to the to-be-accessed device, includes sending a verification-passing instruction to the to-be-accessed device, in response to a verification for the signature information being passed, and processing a first private key in the first key pair and the second public key by a first encryption algorithm to generate the first shared key.

In some embodiments, the method includes acquiring the preset public key from the terminal; and/or receiving a device identification sent from the to-be-accessed device, and receiving the preset public key corresponding to the device identification from a server. The server establishes a communication connection with the terminal.

In some embodiments, the first key pair includes two key pairs, the first key negotiation information is a personal identification number (PIN) code, and the generating a first shared key based on the first key pair and the first key negotiation information corresponding to the to-be-accessed device, includes acquiring the PIN code shared by the to-be-accessed device based on a preset password-sharing manner; receiving third public keys sent from the to-be-accessed device, the number of the third public keys being two; and generating the first shared key based on the PIN code, the first key pair, and the third public keys by a second encryption algorithm.

In some embodiments, after sending the encrypted network configuration information to the to-be-accessed device, the method further includes outputting a device-verifying indication for indicating to perform a verifying operation on the to-be-accessed device, to perform a user verification.

In a second aspect, a network connection method is provided in the embodiments of the present disclosure provide. The method is performed by a to-be-accessed device, and the to-be-accessed device is a device to access a network. The method includes establishing a pre-connection with a terminal, and receiving a first public key sent from the terminal; generating a second shared key based on the first public key and second key negotiation information; decrypting encrypted network configuration information by the second shared key to obtain network configuration information of a network device, in a case of receiving the encrypted network configuration information sent from the terminal. The encrypted network configuration information is obtained by the terminal encrypting the network configuration information by a first shared key, the first shared key is the same as the second shared key, and the first shared key is generated by the terminal based on first key pair corresponding to the first public key and first key negotiation information matching to the second key negotiation information; and accessing to the network device based on the network configuration information.

In some embodiments, the second key negotiation information is a preset private key, and the generating a second shared key based on the first public key and second key negotiation information, includes processing the preset private key and the first public key by a first encryption algorithm to generate the second shared key.

In some embodiments, the second key negotiation information is a preset private key, and the generating a second shared key based on the first public key and second key negotiation information, includes generating a second key pair, and sending a second public key of the second key pair to the terminal; signing the first public key and the second public key by the preset private key to obtain signature information, and sending the signature information to the terminal for the terminal to verify the signature information; and processing a second private key of the second key pair and the first public key by a first encryption algorithm in a case of receiving a verification-passing instruction of the terminal, to generate the second shared key.

In some embodiments, the number of first public keys is two, the second key negotiation information is a PIN code, and the generating a second shared key based on the first public key and second key negotiation information, includes sharing the PIN code to the terminal based on a preset password-sharing manner; generating a third key pair, the third key pair including two key pairs; and sending third public keys of the third key pair to the terminal, and generating the second shared key based on the PIN code, the third key pair, and the first public key by a second encryption algorithm. The number of the third public keys is two.

In some embodiments, after the generating a second shared key based on the first public key and second key negotiation information and before the decrypting encrypted network configuration information by the second shared key to obtain network configuration information of a network device, the method further includes receiving a verifying operation; The decrypting encrypted network configuration information by the second shared key to obtain network configuration information of a network device includes decrypting the encrypted network configuration information by the second shared key to obtain the network configuration information in a case where the verifying operation matches a preset verifying operation.

In a third aspect, a terminal is provided in the embodiments of the present disclosure and includes a first sending unit, a first generation unit, and a first encryption unit. The first sending unit is configured to establish a pre-connection with to-be-accessed device, and the to-be-accessed device is a device to access a network; send a first public key of a first key pair to the to-be-accessed device; and send encrypted network configuration information to the to-be-accessed device, to allow the to-be-accessed device to decrypt the encrypted network configuration information by a second shared key, and access to a network device based on the decrypted network configuration information. The first generation unit is configured to generate the first key pair; and generate a first shared key based on the first key pair and first key negotiation information corresponding to the to-be-accessed device. The first encryption unit is configured to encrypt the network configuration information of the network device by the first shared key to obtain the encrypted network configuration information. The second shared key is the same as the first shared key, and the second shared key is generated by the to-be-accessed device based on the first public key and second key negotiation information matching to the first key negotiation information.

In some embodiments, the first key negotiation information is a preset public key, and the first encryption unit is further configured to process a first private key of the first key pair and the preset public key by a first encryption algorithm to obtain the first shared key.

In some embodiments, the first key negotiation information is a preset public key, and the terminal further includes a first receiving unit and a signature verifying unit. The first receiving unit is configured to receive a second public key sent from the to-be-accessed device, and receive signature information sent from the to-be-accessed device. The second public key is a public key of a second key pair generated by the to-be-accessed device. The signature verifying unit is configured to verify the signature information by the preset public key, the first public key, and the second public key. The signature information is obtained by the to-be-accessed device signing the first public key and the second public key with a preset private key, and the preset private key is a second key negotiation message matching to the preset public key.

In some embodiments, the first receiving unit is further configured to send a verification-passing instruction to the to-be-accessed device, in response to a verification for the signature information being passed. The first encryption unit is configured to process a first private key of the first key pair and the second public key by a first encryption algorithm to obtain the first shared key.

In some embodiments, the terminal further includes an acquiring unit. The acquiring unit is configured to acquire the preset public key from the terminal. The first receiving unit is configured to receive a device identification sent from the to-be-accessed device, and receive the preset public key corresponding to the device identification from a server. The server establishes a communication connection with the terminal.

In some embodiments, the number of first key pairs is two, and first key negotiation information is a PIN code. The acquiring unit is configured to acquire the PIN code shared by the to-be-accessed device based on a preset password-sharing manner. The first receiving unit is configured to receive third public keys sent from the to-be-accessed device, and the number of the third public keys is two. The first generation unit is configured to generate the first shared key based on the PIN code, the first key pair, and the third public keys by a second encryption algorithm.

In some embodiments, the terminal further includes an indication unit, and the indication unit is configured to output a device-verifying indication for indicating to perform a verifying operation on the to-be-accessed device, to perform a user verification.

In a fourth aspect, a to-be-accessed device is provided in the embodiments of the present disclosure. The to-be-accessed device is a device to access a network and includes a second receiving unit, a second generation unit, a decryption unit, and a network connection unit. The second receiving unit is configured to establish a pre-connection with a terminal and receive a first public key sent from the terminal. The second generation unit is configured to generate a second shared key based on the first public key and second key negotiation information. The decryption unit is configured to encrypted network configuration information by the second shared key to obtain network configuration information of a network device, in a case of receiving the encrypted network configuration information sent from the terminal. The encrypted network configuration information is obtained by the terminal encrypting the network configuration information by a first shared key, the first shared key is the same as the second shared key, and the first shared key is generated by the terminal based on first key pair corresponding to the first public key and first key negotiation information matching to the second key negotiation information. The network connection unit is configured to access the network device based on the network configuration information.

In some embodiment, the second key negotiation information is a preset private key, and the to-be-accessed device further includes a second encryption unit. The second encryption unit is configured to process the preset private key and the first public key by a first encryption algorithm to generate the second shared key.

In some embodiment, the second key negotiation information is a preset private key, and the to-be-accessed device further includes a second sending unit. The second generation unit is configured to generate a second key pair. The second sending unit is configured to send a second public key of the second key pair to the terminal, send the signature information to the terminal for the terminal to verify signature information. The second encryption unit is configured to process a second private key of the second key pair and the first public key by a first encryption algorithm in a case of receiving a verification-passing instruction of the terminal, to generate the second shared key.

In some embodiments, the number of first public keys is two, and the second key negotiation information is a PIN code. The to-be-accessed device further includes a sharing unit. The sharing unit is configured to share the PIN code to the terminal based on a preset password-sharing manner. The second generation unit is configured to generate a third key pair, and generate the second shared key based on the PIN code, the third key pair, and the first public key by a second encryption algorithm. The third key pair includes two key pairs. The number of the third public keys is two. The second sending unit is further configured to send third public keys of the third key pair to the terminal.

In some embodiment, the second receiving unit is further configured to receive a verifying operation. The decryption unit is configured to decrypt the encrypted network configuration information by the second shared key to obtain the network configuration information in a case where the verifying operation matches a preset verifying operation.

In a fifth aspect, a terminal is provided in the embodiments of the present disclosure. The terminal includes a first processor, a first transmitter, a first receiver, a first memory, and a first communication bus. When the first processor executes a program stored in the first memory, the first processor is caused to implement the above network connection method.

In a sixth aspect, a to-be-accessed device is provided in the embodiments of the present disclosure. The to-be-accessed device includes a second processor, a second transmitter, a second receiver, a second memory, and a second communication bus. When the second processor executes a program stored in the second memory, the second processor is caused to implement the above network connection method.

In a seventh aspect, a first storage medium is provided in the embodiments of the present disclosure. The first storage medium stores a computer program. When the computer program is executed by a first processor, the first processor is caused to implement the above network connection method.

In a seventh aspect, a second storage medium is provided in the embodiments of the present disclosure. The second storage medium stores a computer program. When the computer program is executed by a second processor, the second processor is caused to implement the above network connection method.

A network connection method, a terminal, a to-be-accessed device, and a storage medium are provided in the embodiments of the present disclosure. The method is performed by the terminal and includes establishing a pre-connection with a to-be-accessed device, the to-be-accessed device being a device to access network; generating a first key pair, and sending a first public key of the first key pair to the to-be-accessed device; generating a first shared key based on the first key pair and first key negotiation information corresponding to the to-be-accessed device; encrypting network configuration information of a network device by the first shared key, to obtain encrypted network configuration information; and sending the encrypted network configuration information to the to-be-accessed device, to allow the to-be-accessed device to decrypt the encrypted network configuration information by a second shared key; and access to the network device based on the decrypted network configuration information. The second shared key is the same as the first shared key, and the second shared key is generated by the to-be-accessed device based on the first public key and second key negotiation information matching to the first key negotiation information. Adopting the above implementation solution, the terminal is configured to generate the first shared key based on the first key negotiation information corresponding to the to-be-accessed device, and the first shared key is the same as the second shared key at the to-be-accessed device side. In addition, the terminal is configured to transmit the encrypted network configuration information of the network device after encrypting the network configuration information by the first shared key. In this way, the security of transmitting the network configuration information is improved, and the security of the network connection is improved accordingly. It should be understood that the specific embodiments described herein are simply configured to explain the present disclosure, but not to limit the present disclosure.

The existing process of the terminal being connected to the WiFi hotspot of the to-be-accessed device is as shown in FIG. 1. The to-be-accessed device opens the WiFi hotspot after powered on. Subsequently, the terminal searches for the WiFi hotspot and establishes the pre-connection with the to-be-accessed device to be connected to the WiFi hotspot. The terminal sends the network configuration information such as the WiFi name, and the WiFi password to the to-be-accessed device, and the to-be-accessed device accesses the network device based on the network configuration information.

However, according to the existing network connection method, in a process of transmitting the network configuration information, the network configuration information may be acquired by the attacker, such that the network configuration information may be leaked, and a problem such as the attacker entering a home network of the user and stealing the privacy of the user, may be further caused.

Figure 2:
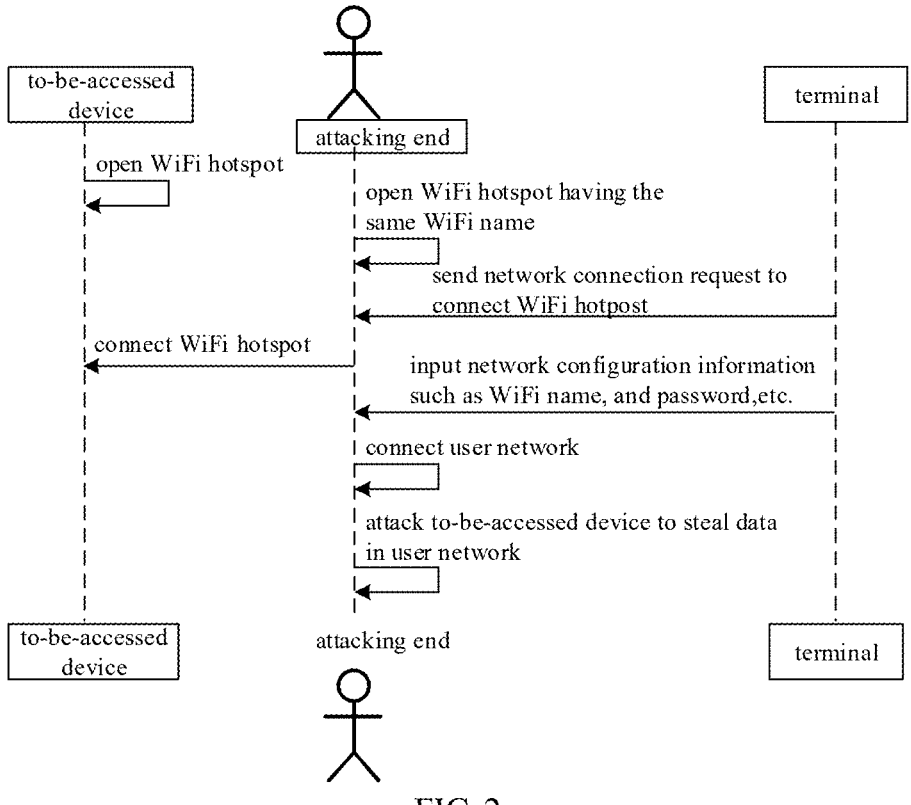
FIG. 2 is a schematic view of an interaction in which an attacking end intercepts network configuration information.

As shown in FIG. 2, the to-be-accessed device opens a first WiFi hotspot, and the attacking end opens a second WiFi hotspot having the same WiFi name with the first WiFi hotspot. The terminal searches for the second WiFi hotspot at the attacking end, sends a network connection request to the attacking end for being connected to the second WiFi hotspot, and sends the network configuration information to the attacking end. The attacking end is connected to the network through the network configuration information and attacks the to-be-accessed device to steal data in the user network.

In order to solve the above problems, a network connection method is provided in the present disclosure and is described in detail in the following embodiments.

In an embodiment of the present disclosure, the network connection method is provided. The method is performed by the terminal, as shown in FIG. 3. The method includes operations at blocks S101-S105.

At block S101, the method includes establishing a pre-connection with a to-be-accessed device, wherein the to-be-accessed device is a device to access network.

A network connection method provided in some embodiments of the present disclosure may be applied in a scenario where the terminal is connected to the WiFi hotspot of the to-be-accessed device, or a scenario where the terminal is connected to the to-be-accessed device in a wireless connection manner, such as a Bluetooth connection or an NFC connection. The scenario where the terminal is connected to the WiFi hotspot of the to-be-accessed device is taken as an example to illustrate the embodiments of the present disclosure.

In the embodiments of the present disclosure, the terminal may be any device having communication and storage functions, e.g., a tablet, a mobile phone, a Personal Computer (PC), a laptop, a wearable device, and the like.

In the embodiments of the present disclosure, the to-be-accessed device for the network connection may include various appliances in the smart home, such as a refrigerator, an air conditioner, a smart socket, an air purifier, a humidifier, a heater, or the like, without any limitation herein.

In the embodiments of the present disclosure, the to-be-accessed device opens the WiFi hotspot. The WiFi hotspot is displayed in a network search interface of the terminal. When the user selects the WiFi hotspot, the terminal establishes the pre-connection with the to-be-accessed device to be connected to the WiFi hotspot.

At block S102, the method includes generating a first key pair, and sending a first public key of the first key pair to the to-be-accessed device.

After the terminal establishes the pre-connection with the to-be-accessed device, the terminal generates the first key pair and sends the first public key of the first key pair to the to-be-accessed device.

In the embodiments of the present disclosure, after the terminal establishes the pre-connection with the to-be-accessed device, the terminal randomly generates the first key pair. The first key pair includes the first public key and a first private key. The terminal sends the first public key of the first key pair to the to-be-accessed device.

In the embodiments of the present disclosure, the first key pair has a key pair type of an Elliptic-Curve Cryptography (ECC) key pair.

In the embodiments of the present disclosure, the number of the first key pair may be one or more, which depends on a type of an encryption algorithm to be subsequently used, without any specific limitation in the embodiments of the present disclosure.

At block S103, the method includes generating a first shared key based on the first key pair and first key negotiation information corresponding to the to-be-accessed device.

After the terminal generates the first key pair and sends the first public key of the first key pair to the to-be-accessed device, the terminal generates the first shared key based on the first key pair and the first key negotiation information corresponding to the to-be-accessed device.

In the embodiments of the present disclosure, the process of generating the first shared key based on the first key pair and the first key negotiation information is a process of establishing a secure channel between the terminal and the to-be-accessed device. The terminal may generate the first shared key based on the first key pair and the first key negotiation information by three generation means, i.e, a first generation means, a second generation means, and a third generation means.

It should be noted that for the first generation means and the second generation means, the first key negotiation information is a preset public key, and the terminal may obtain the preset public key of the to-be-accessed device in two ways. A first way is that the terminal pre-stores the preset public key and obtains the preset public key directly from the terminal. A second way is that the preset public key is stored in a server establishing a communication connection with the terminal; and the terminal obtains a device identifier sent by the to-be-accessed device after establishing the pre-connection with the to-be-accessed device, and receives the preset public key corresponding to the device identifier from the server.

It should be noted that the to-be-accessed device may send its device identifier to the terminal by means of broadcast, multicast, etc.

It should be noted that before the to-be-accessed device leaves a factory, a device manufacturer randomly generates a preset key pair having a type of the ECC key pair, writes a preset private key of the preset key pair to the to-be-accessed device, and writes the preset public key to the terminal; or stores the preset public key to the server via a Transport Layer Security (TLS) protocol, and sends the preset public key to the terminal via the TLS.

In the first generation means, the terminal processes the first private key of the first key pair and the preset public key by a first encryption algorithm to generate the first shared key.

It should be noted that in the first generation means, after generating the first key pair, the terminal sends the first public key of the first key pair to the to-be-accessed device, such that the to-be-accessed device processes the first public key and the preset private key by the same first encryption algorithm to obtain a second shared key. The preset private key is a private key corresponding to the preset public key.

In the second generation means, the terminal also receives a second public key sent from the to-be-accessed device, and the second public key is a public key of a second key pair generated by the to-be-accessed device. Subsequently, the terminal receives signature information sent from the to-be-accessed device and verifies the signature information by the preset public key, the first public key, and the second public key. The signature information is obtained by the to-be-accessed device signing the first public key and the second public key with a preset private key, and the preset private key is a second key negotiation message matching to the preset public key. The terminal sends a verification-passing instruction to the to-be-accessed device, in response to a verification for the signature information being passed, and processes the first private key of the first key pair and the second public key by the first encryption algorithm to generate the first shared key.

Specifically, the terminal sends the first public key and a first security parameter of the first public key to the to-be-accessed device, and receives the second public key and a security parameter of the second public key from the to-be-accessed device.

It should be noted that the to-be-accessed device signs the first public key and the second public key by a third encryption algorithm with the preset private key to obtain the signature information. The terminal parses the signature information by the preset public key to obtain a signature content in the signature information. The terminal matches the signature content with the first public key and the second public key. When the match is successful, the signature verification is passed, when the match fails, the signature verification is refused.

In the embodiments of the present disclosure, the third encryption algorithm may be an algorithm which may realize a signature for transmitted data, such as an EDCSA algorithm, or a RSA algorithm, which may be selected specifically according to the actual situation. No limitation is made in the embodiments of the present disclosure.

It should be noted that the terminal sends the verification-passing instruction to the to-be-accessed device, such that the to-be-accessed device may process a second private key of the second key pair and the first public key based on the verification-passing instruction by the same first encryption algorithm to generate the second shared key.

It should be noted that in the first generation means and the second generation means, the first encryption algorithm may be an ECDH algorithm, or a DH algorithm, etc. The specific first encryption algorithm is not limited to the above two algorithms, insofar as the same manufacturing process as described above is such as implemented, and no limitation is made in the embodiments of the present disclosure.

In the third generation means, the first key negotiation information is a PIN code. Before the to-be-accessed device leaves the factory, the device manufacturer randomly generates a PIN code, writes the PIN code to the to-be-accessed device. The terminal acquires the PIN code shared by the to-be-accessed device based on a preset password-sharing manner. The terminal receives third public keys sent from the to-be-accessed device, and the number of the third public keys is two. The terminal generates the first shared key based on the PIN code, the first key pair, and the third public keys by a second encryption algorithm.

It should be noted that in the third generation means, the number of first key pairs is two, and the number of the third public keys is two.

It should be noted that the second encryption algorithm may be a PAKE-type algorithm such as an Elliptic Curve J-PAKE (ECJPAKE) algorithm, or a Secure Remote Password (SRP) algorithm, etc., which may be specifically selected according to the actual situation, and no limitation is made in the embodiments of the present disclosure.

Specifically, the means of the terminal acquiring the PIN code shared by the to-be-accessed device based on the preset password-sharing manner may include the user inputting the PIN code to the terminal, or the terminal scanning a QR code capable of identifying the PIN code. The QR code may be printed on a device housing, a package, or a sticker of the to-be-accessed device, or the to-be-accessed device playing a sound to share the PIN code with the terminal. Specific preset password-sharing manners are not limited to the three ways mentioned above.

Specifically, a process of the terminal generating the first shared key based on the PIN code, the first key pair, and the third public keys by the second encryption algorithm includes three stages. In the first stage, the terminal generates two key pairs, i.e., a key pair 1 and a key pair 2. The key pair 1 includes a public key 1 and a private key 1, and the key pair 2 includes a public key 2 and a private key 2. The terminal generates a signature 1 by the private key 1 and generates a signature 2 by the private key 2. The terminal sends the public key 1, the signature 1, the public key 2 and the signature 2 to the to-be-accessed device, and receives a public key 3, a signature 3 corresponding to the public key 3, a public key 4 and a signature 4 corresponding to the public key 4 from the to-be-accessed device. In the second stage, the terminal generates a public key 5 and a signature 5 corresponding to the public key 5 based on the key pair 1, the key pair 2, the public key 3, the public key 4, and the PIN code. The terminal sends the public key 5 and the signature 5 to the to-be-accessed device, and receives a public key 6 and a signature 6 sent from the to-be-accessed device. In the third stage, the terminal generates the first shared key based on the PIN code, the public key 6, and the key pair 2.

It should be noted that a process of generating the signature 3 and the signature 4 by the to-be-accessed device is the same as a process of generating the signature 1 and the signature 2 by the terminal, and a process of generating the public key 6 and the signature 6 by the to-be-accessed device is the same as a process of generating the public key 5 and the signature 5 by the terminal, which will not be repeated herein.

At block S104, the method includes encrypting network configuration information of a network device by the first shared key, to obtain encrypted network configuration information.

After the terminal generates the first shared key based on the first key pair and the first key negotiation information corresponding to the to-be-accessed device, the terminal encrypts the network configuration information of the network device by the first shared key, to obtain the encrypted network configuration information.

In the embodiments of the present disclosure, the terminal may encrypt the network configuration information of the network device with the first shared key by an Advanced Encryption Standard (AES)-128-Galois Counter Mode (GCM) algorithm to obtain the encrypted network configuration information.

At block S105, the method includes sending the encrypted network configuration information to the to-be-accessed device, to allow the to-be-accessed device to decrypt the encrypted network configuration information by a second shared key, and access to the network device based on the decrypted network configuration information. The second shared key is the same as the first shared key, and the second shared key is generated by the to-be-accessed device based on the first public key and the second key negotiation information matching to the first key negotiation information.

After the terminal encrypts the network configuration information of the network device with the first shared key and obtains the encrypted network configuration information, the terminal sends the encrypted network configuration information to the to-be-accessed device. The to-be-accessed device decrypts the encrypted network configuration information by the second shared key identical to the first shared key to obtain the network configuration information of the terminal. The to-be-accessed device is connected to the network device according to the decrypted network configuration information.

Further, after sending the encrypted network configuration information to the to-be-accessed device, the terminal may also output a device-verifying indication for indicating to perform a user verification on the to-be-accessed device.

In some embodiments, the user verification may include selecting a specified number, letter, or text; or touching a certain key on the terminal; or sliding a display cube on a display interface of the terminal to a specified region, etc.

It can be understood that the terminal generates the first shared key identical to the second shared key at the to-be-accessed device side based on the first key negotiation information corresponding to the to-be-accessed device, and encrypts the network configuration information of the network device so as to transmit the encrypted network configuration information. In this way, the security of transmitting the network configuration information may be improved and the security of the network connection may be improved accordingly.

In another embodiment of the present disclosure, a network connection method is provided. The method is performed by a network device, and the to-be-accessed device is a device to access a network. As shown in FIG. 4, the method includes operations at blocks S201-S204.

At block S201, the method includes establishing a pre-connection with a terminal, and receiving a first public key sent from the terminal.

A network connection method provided in some embodiments of the present disclosure may be applied in the scenario where the terminal is connected to the WiFi hotspot of the to-be-accessed device, or the scenario where the terminal is connected to the to-be-accessed device in the wireless connection manner such as the Bluetooth connection. The scenario where the terminal is connected to the WiFi hotspot of the to-be-accessed device is taken as an example to illustrate the embodiments of the present disclosure.

In the embodiments of the present disclosure, the to-be-accessed device for the network connection may include various appliances in the smart home, such as the refrigerator, the air conditioner, the smart socket, the air purifier, the humidifier, the heater, or the like, without any limitation herein.

In the embodiments of the present disclosure, the terminal may be any device having the communication and storage functions, e.g., the tablet, the mobile phone, the PC, the laptop, the wearable device, and the like.

In the embodiments of the present disclosure, the to-be-accessed device opens the WiFi hotspot, and the terminal may search for the WiFi hotspot and select the WiFi hotspot. In this case, the to-be-accessed device establishes the pre-connection with the terminal to be connected to the WiFi hotspot. Subsequently, the to-be-accessed device receives the first public key sent from the terminal. A specific type of the first public key depends on a type of an encryption algorithm to be subsequently used, without any specific limitation in the embodiments of the present disclosure.

At block S202, the method includes generating a second shared key based on the first public key and second key negotiation information.

After the to-be-accessed device receives the first public key sent from the terminal, the o-be-accessed device generates the second shared key based on the first public key and second key negotiation information.

In the embodiments of the present disclosure, a process of the to-be-accessed device generating the second shared key based on the first public key and second key negotiation information is the process of establishing the secure channel between the terminal and the to-be-accessed device. The terminal may generate the second shared key based on the first public key and second key negotiation information by the three generation means as described in the terminal side.

It should be noted that the second key negotiation information and the first key negotiation information at the terminal side are the same or correspond to each other. A specific type of the second key negotiation information may be determined based on the type of the adopted encryption algorithm, without specific limitations in the embodiments of the present disclosure.

It should be noted that in the first generation means and the second generation means, the second key negotiation information is a preset private key.

It should be noted that before the to-be-accessed device leaves the factory, the device manufacturer randomly generates a preset key pair having a type of the ECC key pair, writes a preset private key of the preset key pair to the to-be-accessed device, and writes the preset public key to the terminal; or stores the preset public key to the server via the TLS protocol, and sends the preset public key to the terminal via the TLS.

In the first generation means, the to-be-accessed device processes the preset private key and the first public key by the same first encryption algorithm as the terminal side to generate the second shared key.

In the second generation means, the to-be-accessed device generates a second key pair, and sends a second public key of the second key pair to the terminal. The to-be-accessed device signs the first public key and the second public key by the preset private key to obtain signature information, and sends the signature information to the terminal for the terminal to verify the signature information. The to-be-accessed device processes a second private key of the second key pair and the first public key by the same first encryption algorithm as the terminal side, in a case of receiving a verification-passing instruction of the terminal, to generate the second shared key.

Specifically, the to-be-accessed device receives the first public key sent from the terminal and the first security parameter of the first public key, and the to-be-accessed device sends the second public key and the security parameter of the second public key to the terminal.

It should be noted that the to-be-accessed device signs the first public key and the second public key by a third encryption algorithm with the preset private key to obtain the signature information.

In the embodiments of the present disclosure, the third encryption algorithm may be the algorithm which may realize the signature for the transmitted data, such as the EDCSA algorithm, or the RSA algorithm, which may be selected specifically according to the actual situation. No limitation is made in the embodiments of the present disclosure.

It should be noted that in the first generation means and the second generation means, the first encryption algorithm may be the ECDH algorithm, or the DH algorithm, etc. The specific first encryption algorithm is not limited to the above two algorithms, insofar as the same manufacturing process as described above is such as implemented, and no limitation is made in the embodiments of the present disclosure.

It should be noted that in the third generation means, the number of first public keys is two, and the second key negotiation information is a PIN code.

In the third generation means, the to-be-accessed device shares the PIN code to the terminal based on a preset password-sharing manner. The to-be-accessed device generates a third key pair, and the third key pair includes two key pairs. The to-be-accessed device sends third public keys of the third key pair to the terminal, and generates the second shared key based on the PIN code, the third key pair, and the first public key by a second encryption algorithm. The number of the third public keys is two.

It should be noted that the second encryption algorithm may be the PAKE-type algorithm such as the ECJPAKE algorithm, or the SRP algorithm, etc., which may be specifically selected according to the actual situation, and no limitation is made in the embodiments of the present disclosure.

Specifically, a process of the to-be-accessed device generating the second shared key based on the PIN code, the third key pair, and the first public key by the second encryption algorithm includes three stages. In the first stage, the terminal generates two key pairs, i.e., a key pair 3 and a key pair 4. The key pair 3 includes a public key 3 and a private key 3, and the key pair 4 includes a public key 4 and a private key 4. The to-be-accessed device generates a signature 3 by the private key 3 and generates a signature 4 by the private key 4. The to-be-accessed device sends the public key 3, the signature 3, the public key 4 and the signature 4 to the terminal, and receives a public key 1, a signature 1 corresponding to the public key 1, a public key 2 and a signature 2 corresponding to the public key 2 from the terminal. In the second stage, the to-be-accessed device generates a public key 6 and a signature 6 corresponding to the public key 6 based on the key pair 3, the key pair 4, the public key 1, the public key 2, and the PIN code. The to-be-accessed device sends the public key 6 and the signature 6 to the terminal, and receives a public key 5 and a signature 5 sent from the terminal. In the third stage, the to-be-accessed device generates the second shared key based on the PIN code, the public key 5, and the key pair 4.

At block S203, the method includes decrypting encrypted network configuration information by the second shared key to obtain network configuration information of a network device, in a case of receiving the encrypted network configuration information sent from the terminal. The encrypted network configuration information is obtained by the terminal encrypting the network configuration information by a first shared key, the first shared key is the same as the second shared key, and the first shared key is generated by the terminal based on first key pair corresponding to the first public key and first key negotiation information matching to the second key negotiation information.

After the to-be-accessed device generates the second shared key based on the first public key and the second key negotiation information, the to-be-accessed device receives the encrypted network configuration information sent from the terminal, and decrypts the encrypted network configuration information by the second shared key to obtain the network configuration information of the network device, in the case of receiving the encrypted network configuration information.

Further, after generating the second shared key based on the first public key and the second key negotiation information and before decrypting the encrypted network configuration information by the second shared key to obtain the network configuration information of the network device, the to-be-accessed device receives a verifying operation, and compares the received verifying operation with a preset verifying operation to determine whether the network connection request is initiated by a true user. In this case, only when the received verifying operation matches the preset verifying operation, may the to-be-accessed device decrypts the encrypted network configuration information by the second shared key to obtain the network configuration information of the network device.

In some embodiments, the user verification may include selecting the specified number, letter, or text; or touching the certain key on the terminal; or sliding the display cube on the display interface of the terminal to the specified region, etc.

At block S204, the method includes accessing to the network device based on the network configuration information.

After the to-be-accessed device decrypts the encrypted network configuration information by the second shared key to obtain the network configuration information of the network device, the to-be-accessed device accesses to the network device based on the network configuration information, achieving the network connection.

It can be understood that the to-be-accessed device generates the second shared key based on the first public key sent by the terminal and the second key negotiation information preset by the to-be-accessed device, and the second shared key is the same as the first shared key at the terminal side. In addition, the to-be-accessed device is configured to decrypt the received encrypted network configuration information by the second shared key, and access to the network device based on the decrypted network configuration information. In this way, the security of the network connection is improved while the security of transmitting the network configuration information is improved.

Figure 5:
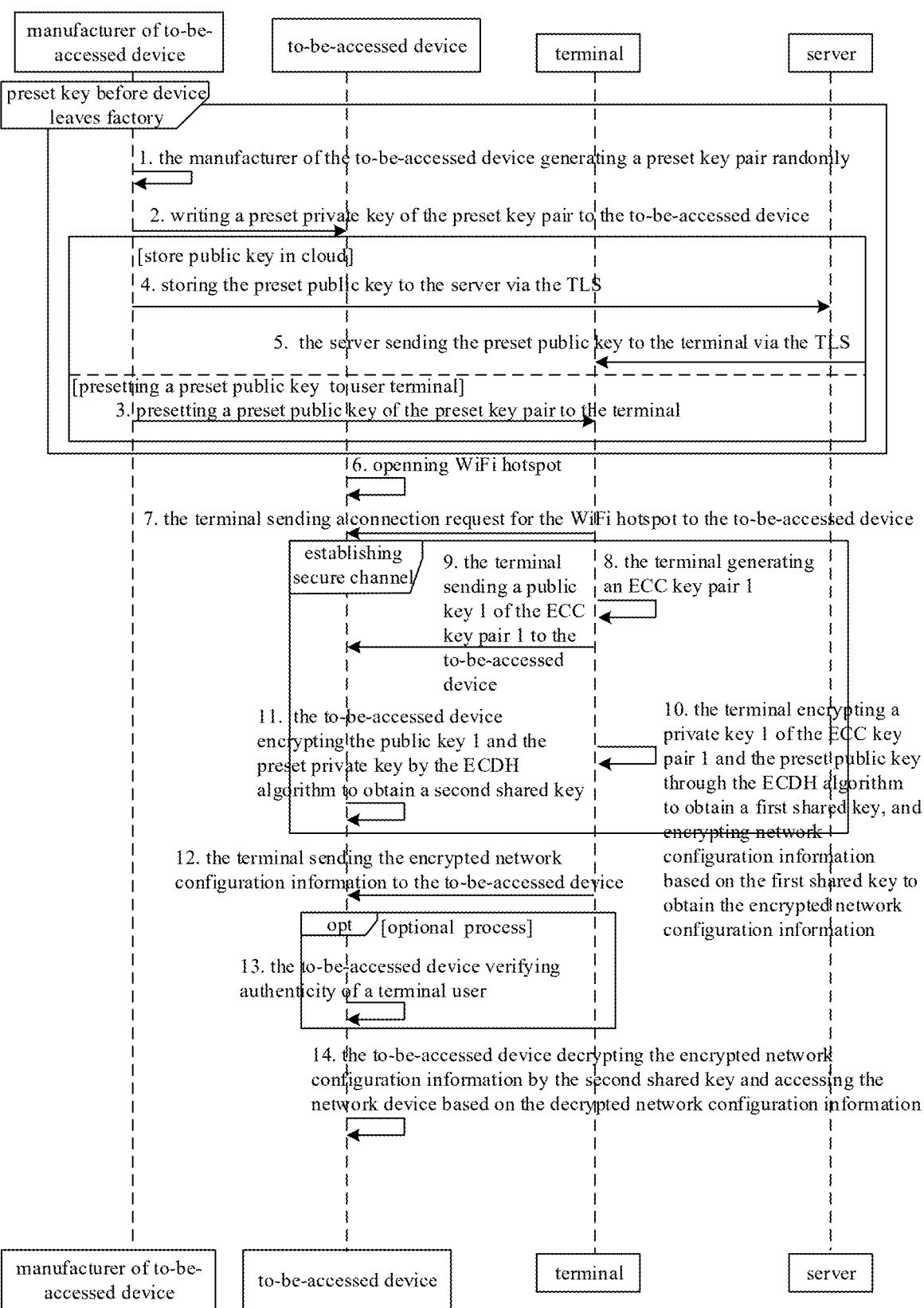
FIG. 5 is a schematic view one of the interaction in which the terminal is connected to the WiFi hotspot of the to-be-accessed device according to some embodiments of the present disclosure.

In a practical application, a shared key is generated between the terminal and the to-be-accessed device by the ECDH algorithm, such that the to-be-accessed device is connected to the network device. Specific steps are shown in FIG. 5.

Step 1, the manufacturer of the to-be-accessed device generating a preset key pair randomly;

Step 2, writing a preset private key of the preset key pair to the to-be-accessed device;

It should be noted that the step 1 and the step 2 are a process of the manufacturer of the to-be-accessed device presetting a key before the device leaving the factory.

Step 3, presetting a preset public key of the preset key pair to the terminal;

Step 4, storing the preset public key to the server via the TLS;

Step 5, the server sending the preset public key to the terminal via the TLS;

It should be noted that steps 4-5 and the step 3 are two parallel or concurrent steps after the step 2, which are selected to be executed respectively according to the actual situation, and no specific limitation is made herein.

Step 6, the to-be-accessed device opening a WiFi hotspot;

Step 7, the terminal sending a connection request for the WiFi hotspot to the to-be-accessed device;

Step 8, the terminal generating an ECC key pair 1;

Step 9, the terminal sending a public key 1 of the ECC key pair 1 to the to-be-accessed device;

Step 10, the terminal encrypting a private key 1 of the ECC key pair 1 and the preset public key through the ECDH algorithm to obtain a first shared key, and encrypting network configuration information based on the first shared key to obtain the encrypted network configuration information;

Step 11, the to-be-accessed device encrypting the public key 1 and the preset private key by the ECDH algorithm to obtain a second shared key;

It should be noted that steps 8-11 is a process of establishing a secure channel between the to-be-accessed device and the terminal.

Step 12, the terminal sending the encrypted network configuration information to the to-be-accessed device;

Step 13, the to-be-accessed device verifying authenticity of a terminal user;

It should be noted that the step 13 is an alternative step between the step 12 and the step 14, whether to execute the step 13 may be selected according to the actual situation and is not limited herein.

Step 14, the to-be-accessed device decrypting the encrypted network configuration information by the second shared key and accessing the network device based on the decrypted network configuration information.

Figure 6:
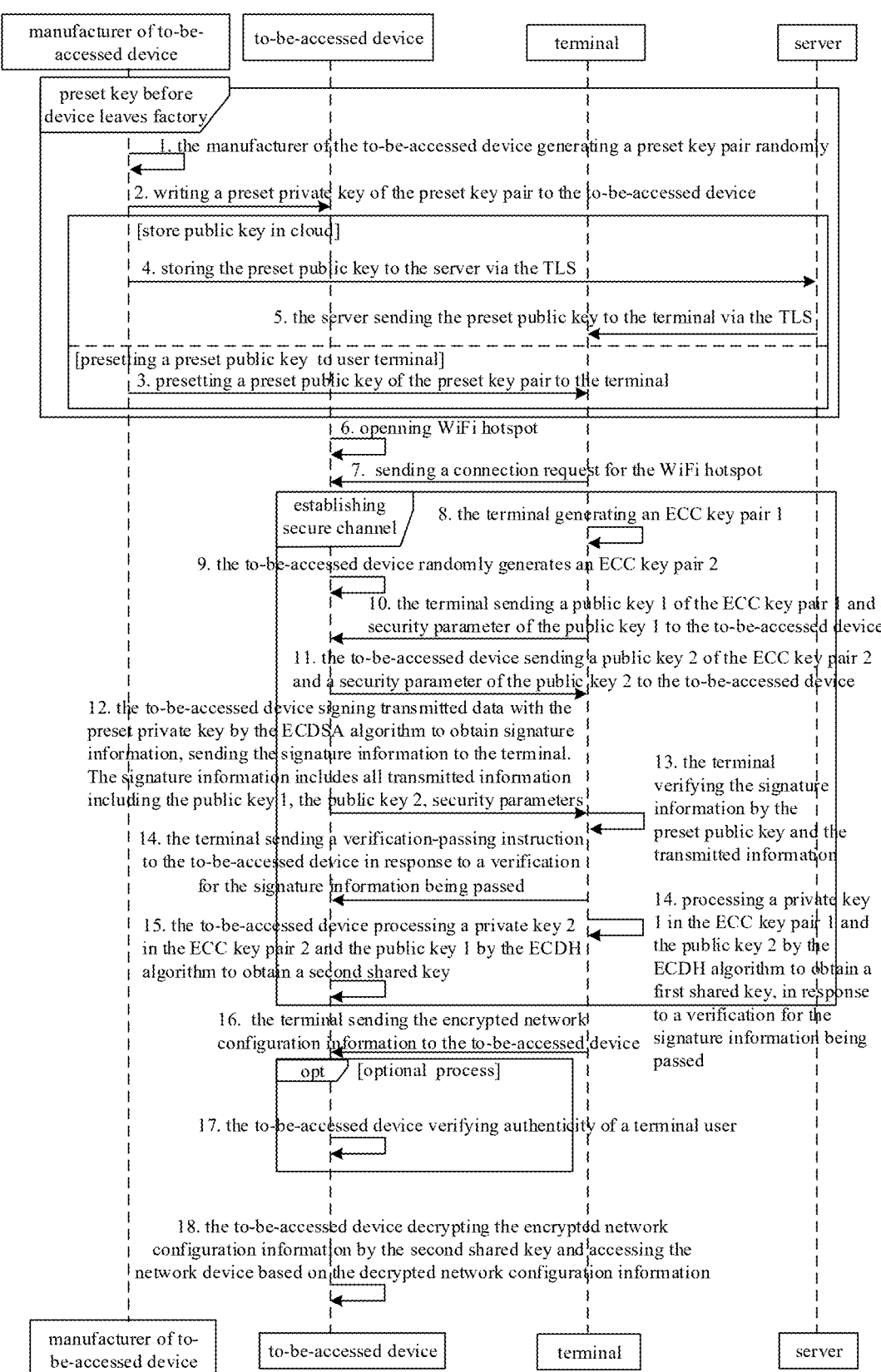
FIG. 6 is a schematic view two of the interaction in which the terminal is connected to the WiFi hotspot of the to-be-accessed device according to some embodiments of the present disclosure.

In another practical application, the shared key is generated between the terminal and the to-be-accessed device by the ECDH algorithm, and the public key is verified by the ECDSA algorithm, such that the to-be-accessed device is accessed to the network device. Specific steps are shown in FIG. 6.

Step 1, the manufacturer of the to-be-accessed device generating a preset key pair randomly;

Step 2, writing a preset private key of the preset key pair to the to-be-accessed device;

It should be noted that the step 1 and the step 2 are a process of the manufacturer of the to-be-accessed device presetting a key before the device leaving the factory.

Step 3, presetting a preset public key of the preset key pair to the terminal;

Step 4, storing the preset public key to the server via the TLS;

Step 5, the server sending the preset public key to the terminal via the TLS;

It should be noted that steps 4-5 and the step 3 are two parallel or concurrent steps after the step 2, which are selected to be executed respectively according to the actual situation, and no specific limitation is made herein.

Step 6, the to-be-accessed device opening a WiFi hotspot;

Step 7, the terminal sending a connection request for the WiFi hotspot to the to-be-accessed device;

Step 8, the terminal generating an ECC key pair 1;

Step 9, the to-be-accessed device randomly generates an ECC key pair 2;

Step 10, the terminal sending a public key 1 of the ECC key pair 1 and a security parameter of the public key 1 to the to-be-accessed device;

Step 11, the to-be-accessed device sending a public key 2 of the ECC key pair 2 and a security parameter of the public key 2 to the to-be-accessed device;

Step 12, the to-be-accessed device signing transmitted data with the preset private key by the ECDSA algorithm to obtain signature information, sending the signature information to the terminal. The signature information includes all transmitted information including the public key 1, the public key 2, security parameters;

Step 13, the terminal verifying the signature information by the preset public key and the transmitted information;

Step 14, the terminal sending a verification-passing instruction to the to-be-accessed device in response to a verification for the signature information being passed, and processing a private key 1 in the ECC key pair 1 and the public key 2 by the ECDH algorithm to obtain a first shared key;

Step 15, the to-be-accessed device processing a private key 2 in the ECC key pair 2 and the public key 1 by the ECDH algorithm to obtain a second shared key;

It should be noted that steps 8-15 is a process of establishing a secure channel between the to-be-accessed device and the terminal.

Step 16, the terminal sending the encrypted network configuration information to the to-be-accessed device;

Step 17, the to-be-accessed device verifying authenticity of the user;

It should be noted that the step 17 is an alternative step between the step 16 and the step 18, whether to execute the step 17 may be selected according to the actual situation and is not limited herein.

Step 18, the to-be-accessed device decrypting the encrypted network configuration information by the second shared key and accessing the network device based on the decrypted network configuration information.

Figure 7:
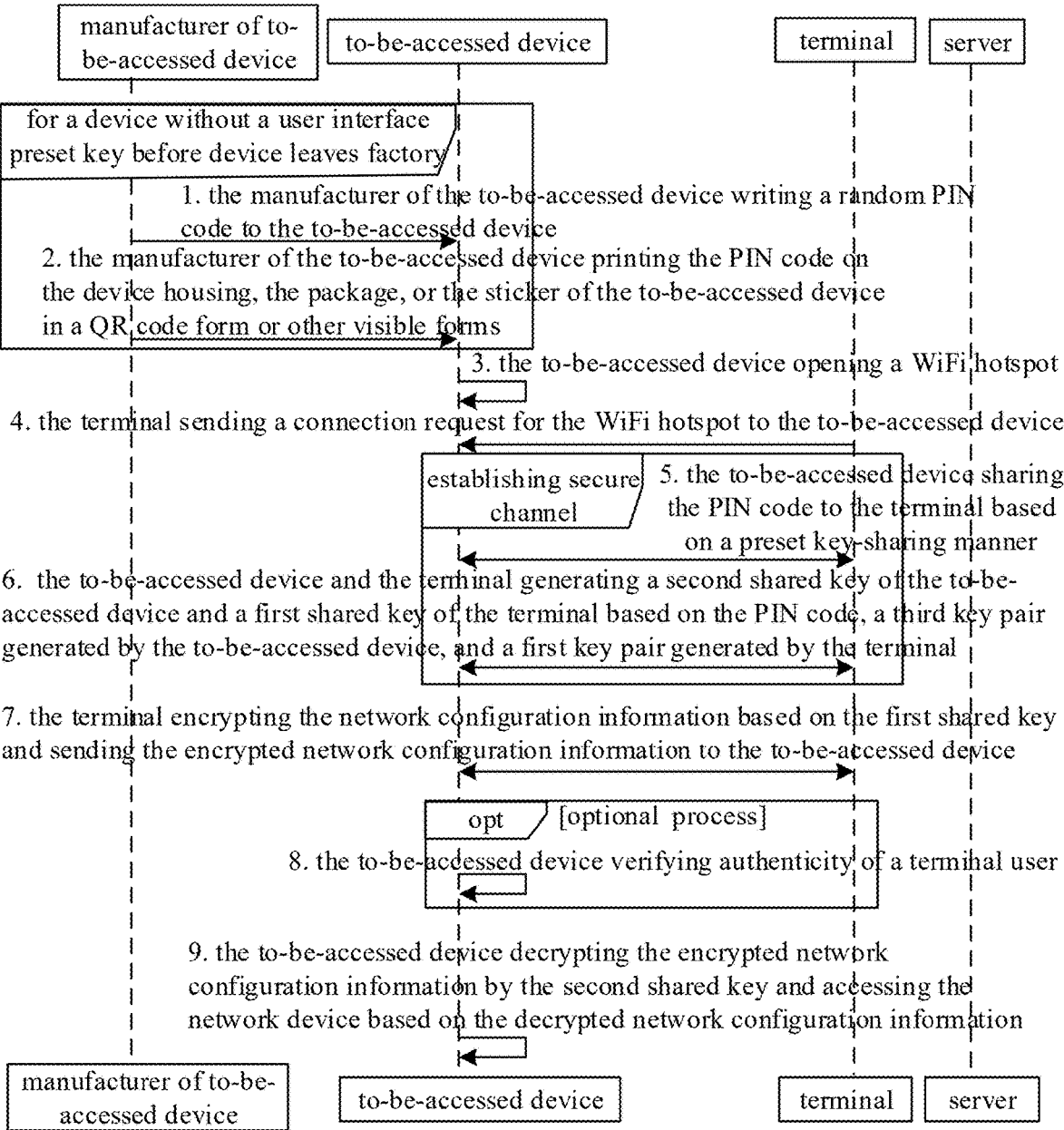
FIG. 7 is a schematic view three of the interaction in which the terminal is connected to the WiFi hotspot of the to-be-accessed device according to some embodiments of the present disclosure.

In another practical application, the shared key is generated between the terminal and the network to-be-accessed device by the ECJPAKE algorithm, such that the to-be-accessed device is accessed to the network device. Specific steps are shown in FIG. 7.

Step 1, the manufacturer of the to-be-accessed device writing a random PIN code to the to-be-accessed device;

Step 2, the manufacturer of the to-be-accessed device printing the PIN code on the device housing, the package, or the sticker of the to-be-accessed device in a QR code form or other visible forms;

It should be noted that the step 1 and the step 2 are a process of the manufacturer of the to-be-accessed device presetting a key before the device leaving the factory.

Step 3, the to-be-accessed device opening a WiFi hotspot;

Step 4, the terminal sending a connection request for the WiFi hotspot to the to-be-accessed device;

Step 5, the to-be-accessed device sharing the PIN code to the terminal based on a preset key-sharing manner;

Step 6, the to-be-accessed device and the terminal generating a second shared key of the to-be-accessed device and a first shared key of the terminal based on the PIN code, a third key pair generated by the to-be-accessed device, and a first key pair generated by the terminal;

It should be noted that steps 5-6 are a process of the manufacturer of the to-be-accessed device presetting a key before the device leaving the factory.

Step 7, the terminal encrypting the network configuration information based on the first shared key and sending the encrypted network configuration information to the to-be-accessed device;

Step 8, the to-be-accessed device verifying authenticity of the user;

It should be noted that the step 8 is an alternative step between the step 7 and the step 9, whether to execute the step 8 may be selected according to the actual situation and is not limited herein.

Step 9, the to-be-accessed device decrypting the encrypted network configuration information by the second shared key and accessing the network device based on the decrypted network configuration information.

Figure 8:
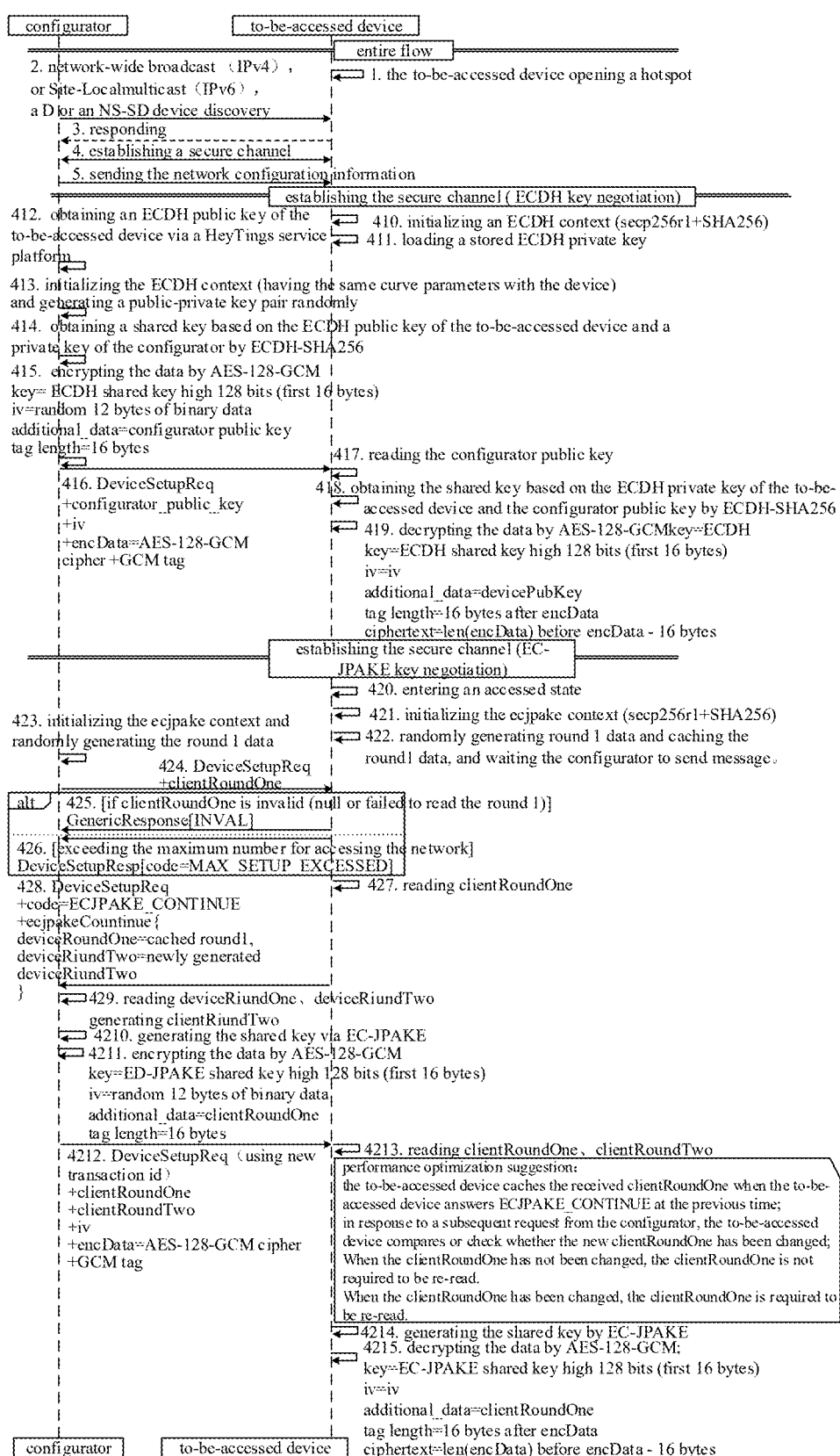
FIG. 8 is a schematic view of an interaction of a method of the to-be-accessed device being accessed to a network device.

In another embodiment of the present disclosure, a method of the to-be-accessed device accessing the network device is provided. As shown in FIG. 8, the method includes the following steps.

Step 1, the to-be-accessed device opening a hotspot;

Step 2, a configurator sending a hotspot connection request to the to-be-accessed device by means of a network-wide broadcast (IPV4), or a Site-Local multicast (IPV6), a D or an NS-SD device discovery;

It should be noted that the configurator is the terminal described above.

Step 3, the to-be-accessed device responding to the hotspot connection request;

Step 4, establishing a secure channel between the to-be-accessed device and the configurator;

It should be noted that the secure channel may be established through ECDH key negotiation, and/or EC-JPAKE key negotiation.

A process of establishing the secure channel through ECDH key negotiation includes the following specific steps.

Step 410, the to-be-accessed device initializing an ECDH context (secp256r1+SHA256);

Step 411, the to-be-accessed device loading a prestored ECDH private key;

Step 412, the configurator obtaining an ECDH public key of the to-be-accessed device via a HeyTings service platform;

Step 413, the configurator initializing the ECDH context (having the same curve parameters with the device) and generating a public-private key pair randomly;

Step 414, the configurator obtaining a shared key based on the ECDH public key of the to-be-accessed device and a private key of the configurator by ECDH-SHA256;

Step 415, the configurator encrypting the data by AES-128-GCM;

key=ECDH shared key high 128 bits (first 16 bytes)

iv=random 12 bytes of binary data additional_data=configurator public key tag length=16 bytes;

Step 416, the configurator sending the following message to the to-be-accessed device:

DeviceSetupReq

+configurator_public_key

+iv

+encData=AES-128-GCM cipher+GCM tag;

Step 417, the to-be-accessed device reading the configurator public key;

Step 418, the to-be-accessed device obtaining the shared key based on the ECDH private key and the configurator public key by ECDH-SHA256;

Step 419, the to-be-accessed device decrypting the data by AES-128-GCM;

key=ECDH shared key high 128 bits (first 16 bytes)
iv=iv
additional_data=devicePubKey
tag length=16 bytes after encData
ciphertext=len(encData) before encData−16 bytes;

The process of establishing the secure channel through the EC-JPAKE key negotiation includes the following specific steps.

Step 420, the to-be-accessed device entering an accessed state;

Step 421, the to-be-accessed device initializing the ecjpake context (secp256r1+SHA256);

Step 422, the to-be-accessed device randomly generating round 1 data and caching the round1 data, and waiting the configurator to send message;

Step 423, the configurator initializing the ecjpake context and randomly generating the round 1 data;

Step 424, the configurator sending DeviceSetupReq+ clientRoundOne to the to-be-accessed device;

Step 425, if clientRoundOne is invalid (null or failed to read the round 1), retuning Generic Response[NVAL] to the configurator;

Step 426, returning DeviceSetupResp [code=MAX_SET_EXCESSED] to the configurator in response to exceeding the maximum number for accessing the network;

Step 427, the to-be-accessed device reading clientRoundOne;

Step 428, the to-be-accessed device sending the following message to the configurator:

DeviceSetupResp
+code=ECJPAKE_CONTINUE
+ecjpakeCountinue{
deviceRoundOne=cached round1.
deviceRoundTwo=newly generated deviceRoundTwo
}

Step 429, the configurator reading deviceRoundOne, deviceRoundTwo and generating clientRoundTwo;

Step 4210, the configurator generating the shared key via EC-JPAKE;

Step 4211, the configurator encrypting the data by AES-128-GCM;

key=ED-JPAKE shared key high 128 bits (first 16 bytes)
iv=random 12 bytes of binary data
additional_data=clientRoundOne
tag length=16 bytes Step 4212, the configurator sending the following message to the to-be-accessed device:

DeviceSetupReq{using new transaction id}
+clientRoundOne
+clientRoundTwo
+iv
+encData=AES-128-GCM cipher+GCM tag Step 4213, the to-be-accessed device readingc lientRoundOne, clientRoundTwo;

It should be noted that a performance optimization suggestion herein is that the to-be-accessed device caches the received clientRoundOne when the to-be-accessed device answers ECJPAKE_CONTINUE at the previous time. In response to a subsequent request from the configurator, the to-be-accessed device compares or check whether the new clientRoundOne has been changed. When the clientRoundOne has not been changed, the clientRoundOne is not required to be re-read. When the clientRoundOne has been changed, the clientRoundOne is required to be re-read.

Step 4214, the to-be-accessed device generating the shared key by EC-JPAKE;

Step 4215, the to-be-accessed device decrypting the data by AES-128-GCM;

key=EC-JPAKE shared key high 128 bits (first 16 bytes)
iv=iv
additional_data=clientRoundOne
tag length=16 bytes after encData
ciphertext=len(encData) before encData−16 bytes;

Step 5, the configurator sending the network configuration information of the network device to the to-be-accessed device.

Figure 9:
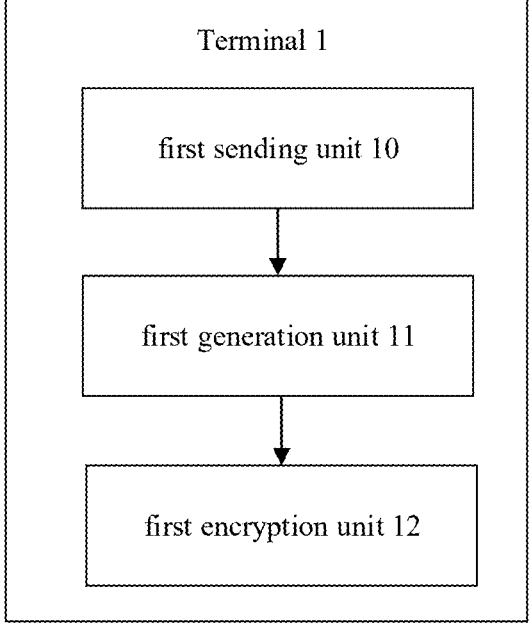
FIG. 9 is a structural schematic view one of the terminal according to some embodiments of the present disclosure.

In another embodiment of the present disclosure, a terminal 1 is provided in the embodiments of the present disclosure embodiment, as shown in FIG. 9. The terminal 1 includes a first sending unit 10, a first generation unit 11, and a first encryption unit 12.

The first sending unit 10 is configured to establish a pre-connection with to-be-accessed device, and the to-be-accessed device is a device to access a network; send a first public key of a first key pair to the to-be-accessed device; and send encrypted network configuration information to the to-be-accessed device, to allow the to-be-accessed device to decrypt the encrypted network configuration information by a second shared key, and access to a network device based on the decrypted network configuration information. The second shared key is the same as the first shared key, and the second shared key is generated by the to-be-accessed device based on the first public key and second key negotiation information matching to the first key negotiation information.

The first generation unit 11 is configured to generate the first key pair; and generate a first shared key based on the first key pair and first key negotiation information corresponding to the to-be-accessed device.

The first encryption unit 12 is configured to encrypt the network configuration information of the network device by the first shared key to obtain the encrypted network configuration information.

In some embodiments, the first key negotiation information is a preset public key.

The first encryption unit 12 is further configured to process a first private key of the first key pair and the preset public key by a first encryption algorithm to obtain the first shared key.

In some embodiments, the first key negotiation information is a preset public key, and the terminal further includes a first receiving unit and a signature verifying unit.

The first receiving unit is configured to receive a second public key sent from the to-be-accessed device, and receive signature information sent from the to-be-accessed device. The second public key is a public key of a second key pair generated by the to-be-accessed device.

The signature verifying unit is configured to verify the signature information by the preset public key, the first public key, and the second public key. The signature information is obtained by the to-be-accessed device signing the first public key and the second public key with a preset private key, and the preset private key is a second key negotiation message matching to the preset public key.

In some embodiments, the first receiving unit 10 is further configured to send a verification-passing instruction to the to-be-accessed device, in response to a verification for the signature information being passed.

The first encryption unit 12 is further configured to process a first private key of the first key pair and the second public key by a first encryption algorithm to obtain the first shared key.

In some embodiments, the terminal further includes an acquiring unit.

The acquiring unit is configured to acquire the preset public key from the terminal.

The first receiving unit is configured to receive a device identification sent from the to-be-accessed device, and receive the preset public key corresponding to the device identification from a server. The server establishes a communication connection with the terminal.

In some embodiments, the number of first key pairs is two, and first key negotiation information is a PIN code.

The acquiring unit is configured to acquire the PIN code shared by the to-be-accessed device based on a preset password-sharing manner.

The first receiving unit is configured to receive third public keys sent from the to-be-accessed device, and the number of the third public keys is two.

The first generation unit 11 is configured to generate the first shared key based on the PIN code, the first key pair, and the third public keys by a second encryption algorithm.

In some embodiments, the terminal further includes an indication unit.

The indication unit is configured to output a device-verifying indication for indicating to perform a verifying operation on the to-be-accessed device, to perform a user verification.

A terminal is provided in above embodiments of present disclosure. The terminal is configured to establish a pre-connection with a to-be-accessed device, and the to-be-accessed device is a device to access network; generate a first key pair, and send a first public key of the first key pair to the to-be-accessed device; generate a first shared key based on the first key pair and first key negotiation information corresponding to the to-be-accessed device; encrypt network configuration information of a network device by the first shared key, to obtain encrypted network configuration information; and send the encrypted network configuration information to the to-be-accessed device, to allow the to-be-accessed device to decrypt the encrypted network configuration information by a second shared key, and access to the network device based on the decrypted network configuration information. Consequently, the terminal in these embodiments of the present disclosure generates the first shared key based on the first key negotiation information corresponding to the to-be-accessed device, and the first shared key is the same as the second shared key at the to-be-accessed device side. In addition, the terminal is configured to transmit the encrypted network configuration information of the network device after encrypting the network configuration information by the first shared key. In this way, the security of transmitting the network configuration information is improved, and the security of the network connection is improved accordingly.

Figure 10:
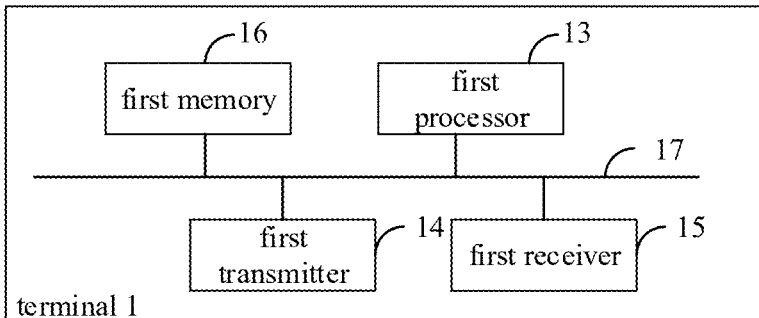
FIG. 10 is a structural schematic view two of the terminal according to some embodiments of the present disclosure.

FIG. 10 is a structural schematic view two of the terminal 1 according to some embodiments of the present disclosure. In the actual application, based on the same disclosure idea of the above embodiments, the terminal 1 of this embodiment includes a first processor 13, a first transmitter 14, a first receiver 15, a first memory 16, and a first communication bus 17, as shown in FIG. 10.

In the process of a specific embodiment, the first generation unit 11, the first encryption unit 12, the signature verification unit, the acquiring unit, and the indicating unit mentioned above may be implemented by the first processor 13 In the terminal 1. The first transmitting unit 10 mentioned above may be implemented by the first transmitter 14 In the terminal 1, and the first receiving unit mentioned above may be implemented by the first receiver 15 In the terminal 1. The first processor 13 may be at least one of an Application Specific Integrated Circuit (ASIC), a Digital Signal Processor (DSP), a Digital Signal Processing Device (DSPD), a Programmable Logic Device (PLD), a Field Programmable Gate Array (FPGA), a CPU (Central Processing Unit), a controller, a microcontroller, a microprocessor. It can be understood that other electronic devices may be allowed for different devices to implement the above functions, and no limitation is made in this embodiment.

In some embodiments of the present disclosure, the first communication bus 17 is configured to be connected to the first processor 13, the first transmitter 14, the first receiver 15, and the first memory 16. The first transmitter 14 is configured to establish a pre-connection with the to-be-accessed device, and send the encrypted network configuration information to the to-be-accessed device. When executing a program stored in the first memory 16, the first processor 13 is configured to implement generating the first shared key based on the first key pair and first key negotiation information corresponding to the to-be-accessed device, and encrypting the network configuration information of the network device by the first shared key, to obtain the encrypted network configuration information.

A first storage medium is provided in some embodiments of the present disclosure provide. The first storage medium stores a computer program. The computer-readable storage medium stores one or more programs. The one or more programs is executed by one or more first processors and is performed by the terminal. The computer program is configured to implement the above network connection method.

Figure 11:
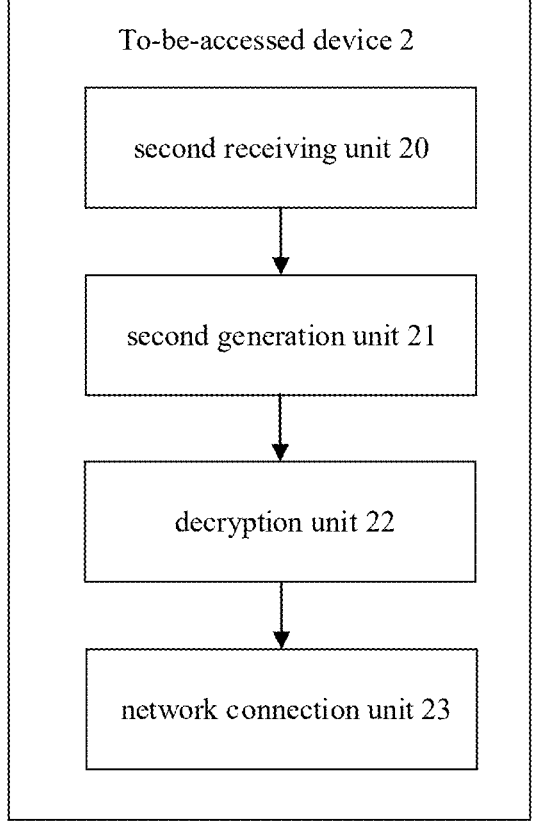
FIG. 11 is a structural schematic view one of the to-be-accessed device according to some embodiments of the present disclosure.

In a further embodiment of the present disclosure, a to-be-accessed network device 2 is provided. The to-be-accessed device is a device to access a network. As shown in FIG. 11, the to-be-accessed network device 2 includes a second receiving unit 20, a second generation unit 21, a decryption unit 22, and a network connection unit 23.

The second receiving unit 20 is configured to establish a pre-connection with a terminal and receive a first public key sent from the terminal.

The second generation unit 21 is configured to generate a second shared key based on the first public key and second key negotiation information.

The decryption unit 22 is configured to encrypted network configuration information by the second shared key to obtain network configuration information of a network device, in a case of receiving the encrypted network configuration information sent from the terminal. The encrypted network configuration information is obtained by the terminal encrypting the network configuration information by a first shared key, the first shared key is the same as the second shared key, and the first shared key is generated by the terminal based on first key pair corresponding to the first public key and first key negotiation information matching to the second key negotiation information.

The network connection unit 23 is configured to access the network device based on the network configuration information.

In some embodiment, the second key negotiation information is a preset private key, and the to-be-accessed device further includes a second encryption unit.

The second encryption unit is configured to process the preset private key and the first public key by a first encryption algorithm to generate the second shared key.

In some embodiment, the second key negotiation information is the preset private key, and the to-be-accessed device further includes a second sending unit.

The second generation unit 21 is configured to generate a second key pair.

The second sending unit is configured to send a second public key of the second key pair to the terminal, send the signature information to the terminal for the terminal to verify the signature information.

The second encryption unit is configured to process a second private key of the second key pair and the first public key by a first encryption algorithm in a case of receiving a verification-passing instruction of the terminal, to generate the second shared key.

In some embodiments, the number of first public keys is two, and the second key negotiation information is a PIN code. The to-be-accessed device further includes a sharing unit.

The sharing unit is configured to share the PIN code to the terminal based on a preset password-sharing manner.

The second generation unit 21 is configured to generate a third key pair, and generate the second shared key based on the PIN code, the third key pair, and the first public key by a second encryption algorithm. The third key pair includes two key pairs. The number of the third public keys is two.

The second sending unit is further configured to send third public keys of the third key pair to the terminal.

In some embodiment, the second receiving unit 20 is further configured to receive a verifying operation.

The decryption unit 22 is configured to decrypt the encrypted network configuration information by the second shared key to obtain the network configuration information in a case where the verifying operation matches a preset verifying operation.

A to-be-accessed device is provided in above embodiments of present disclosure. The to-be-accessed device is the device to access the network and is configured to establish the pre-connection with the terminal; receive the first public key sent from the terminal; generate the second shared key based on the first public key and the second key negotiation information; decrypt encrypted network configuration information by the second shared key to obtain the network configuration information of a network device, in a case of receiving the encrypted network configuration information sent from the terminal; and access to the network device based on the network configuration information. The encrypted network configuration information is obtained by the terminal encrypting the network configuration information by a first shared key, the first shared key is the same as the second shared key, and the first shared key is generated by the terminal based on first key pair corresponding to the first public key and first key negotiation information matching to the second key negotiation information. Consequently, the to-be-accessed device in these embodiments of the present disclosure generates the second shared key based on the first public key sent by the terminal and the second key negotiation information preset by the to-be-accessed device, and the second shared key is the same as the first shared key at the terminal side. In addition, the to-be-accessed device is configured to decrypt the received encrypted network configuration information by the second shared key to obtain the network configuration information of the network device, and access to the network device based on the decrypted network configuration information.

In this way, the security of the network connection is improved while the security of transmitting the network configuration information is improved.

Figure 12:
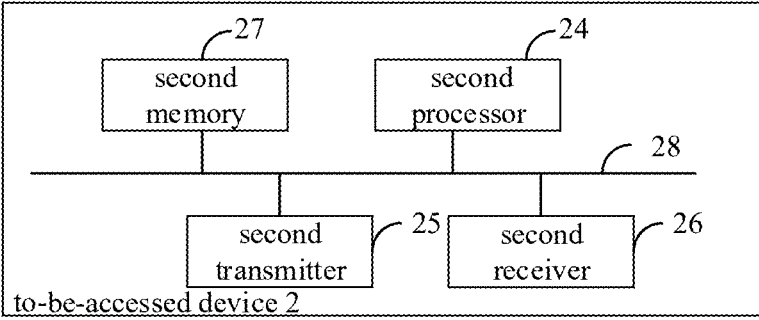
FIG. 12 is a structural schematic view two of the to-be-accessed device according to some embodiments of the present disclosure.

FIG. 12 is a structural schematic view two of the to-be-accessed device 2 according to some embodiments of the present disclosure. In the actual application, based on the same disclosure idea of the above embodiments, the to-be-accessed device 2 of this embodiment includes a second processor 24, a second transmitter 25, a second receiver 26, a second memory 27, and a second communication bus 28, as shown in FIG. 12.

In the process of a specific embodiment, the second generation unit 21, the decryption unit 22, the network connection section 23, the second encryption unit, and the sharing unit may be implemented by the second processor 24 in the to-be-accessed device 2. The second sending unit may be implemented by the second transmitter 25 In the to-be-accessed device 2, and the second receiving unit 20 mentioned above may be implemented by the second receiver 26 In the to-be-accessed device 2. The second processor 20 may be at least one of the ASIC, the DSP, the DSPD, the PLD, the FPGA, the CPU, the controller, the microcontroller, the microprocessor. It can be understood that other electronic devices may be allowed for different devices to implement the above functions, and no limitation is made in this embodiment.

In some embodiments of the present disclosure, the second communication bus 28 is configured to be connected to the second processor 24, the second transmitter 25, the second receiver 26, and the second memory 27. The second receiver 26 is configured to establish a pre-connection with the terminal, and receive a first public key sent from the terminal. When executing a program stored In the second memory 27, the second processor 24 is configured to implementing generating a second shared key based on the first public key and second key negotiation information; decrypting encrypted network configuration information by the second shared key to obtain network configuration information of a network device, in a case of receiving the encrypted network configuration information sent from the terminal; and accessing to the network device based on the network configuration information. The encrypted network configuration information is obtained by the terminal encrypting the network configuration information by a first shared key, the first shared key is the same as the second shared key, and the first shared key is generated by the terminal based on first key pair corresponding to the first public key and first key negotiation information matching to the second key negotiation information.

A second storage medium is provided in some embodiments of the present disclosure provide. The second storage medium stores a computer program. The computer-readable storage medium stores one or more programs. The one or more programs is executed by one or more second processors and is performed by the to-be-accessed device. The computer program is configured to implement the above network connection method.

It should be noted that in this specification, the terms "including", "comprising" or any other variant thereof are intended to cover non-exclusive inclusion, such that a process, a method, an object, or an apparatus including a series of elements not only includes those elements, but also includes other elements which are not listed, or also includes elements inherent to the process, the method, the object, or the apparatus. Without further limitation, a feature defined by the expression "including a . . . " indicates the process, the method, the object, or the apparatus including the feature does not exclude including other same features.

Through the descriptions of the above embodiments, the one of ordinary skill in the art may clearly learn that the above method embodiments may be implemented in a manner of a combination of a software and a general hardware platform, and certainly may also be implemented by a hardware. While in many cases, the previous manner is selected. Based on this understanding, an essential portion or a portion contributing to the related art of the technical solution of the present disclosure may be embodied in a form of a software product. The computer software product is stored in a storage medium (e.g., a ROM/RAM, a disk, or a CD-ROM) and includes a number of instructions to enable an image display device (such as a mobile phone, a computer, the server, an air conditioner, or the to-be-accessed device, etc.) to perform the method described in various embodiments of the present disclosure.

The above descriptions are simply some embodiments of the present disclosure and are not intended to limit the scope of the present disclosure.

What is claimed is:

1. A network connection method, performed by a terminal, wherein the method comprises:

establishing a pre-connection with a to-be-accessed device, wherein the to-be-accessed device is a device to access network;

generating a first key pair, and sending a first public key of the first key pair to the to-be-accessed device;

generating a first shared key based on the first key pair and first key negotiation information corresponding to the to-be-accessed device;

encrypting network configuration information of a network device by the first shared key, to obtain encrypted network configuration information; and sending the encrypted network configuration information to the to-be-accessed device, to allow the to-be-accessed device to decrypt the encrypted network configuration information by a second shared key, and access to the network device based on the decrypted network configuration information;

wherein the second shared key is the same as the first shared key, and the second shared key is generated by the to-be-accessed device based on the first public key and second key negotiation information matching to the first key negotiation information;

wherein the first key negotiation information is a preset public key, and before generating the first shared key based on the first key pair and the first key negotiation information corresponding to the to-be-accessed device, the method further comprises:

receiving a second public key sent from the to-be-accessed device, wherein the second public key is a public key of a second key pair generated by the to-be-accessed device; and receiving signature information sent from the to-be-accessed device, and verifying the signature information by the preset public key, the first public key, and the second public key; wherein the signature information is obtained by the to-be-accessed device signing the first public key and the second public key with a preset private key, and the preset private key is a second key negotiation message matching to the preset public key.

2. The method according to claim 1, wherein the first key negotiation information is a preset public key, and generating the first shared key based on the first key pair and the first key negotiation information corresponding to the to-be-accessed device, comprises:

processing a first private key of the first key pair and the preset public key by a first encryption algorithm to generate the first shared key.

3. The method according to claim 2, comprising:

acquiring the preset public key from the terminal; and/or receiving a device identification sent from the to-be-accessed device, and receiving the preset public key corresponding to the device identification from a server, wherein the server establishes a communication connection with the terminal.

4. The method according to claim 1, wherein generating the first shared key based on the first key pair and the first key negotiation information corresponding to the to-be-accessed device, comprises:

sending a verification-passing instruction to the to-be-accessed device, in response to a verification for the signature information being passed, and processing a first private key of the first key pair and the second public key by a first encryption algorithm to generate the first shared key.

5. The method according to claim 1, wherein the first key pair comprises two key pairs, the first key negotiation information is a personal identification number (PIN) code, and generating the first shared key based on the first key pair and the first key negotiation information corresponding to the to-be-accessed device, comprises:

acquiring the PIN code shared by the to-be-accessed device based on a preset password-sharing manner;

receiving third public keys sent from the to-be-accessed device, wherein the number of the third public keys is two; and generating the first shared key based on the PIN code, the first key pair, and the third public keys by a second encryption algorithm.

6. The method according to claim 1, wherein after sending the encrypted network configuration information to the to-be-accessed device, the method further comprises:

outputting a device-verifying indication for indicating to perform a verifying operation on the to-be-accessed device, to perform a user verification.

7. The method according to claim 1, wherein verifying the signature information by the preset public key, the first public key, and the second public key, comprises:

parsing the signature information by the preset public key to obtain a signature content in the signature information; and matching the signature content with the first public key and the second public key, wherein the signature information is verified to be passed in response to a successful match of the signature content with the first public key and the second public key, and the signature information is verified to be refused in response to a failed match of the signature content with the first public key and the second public key.

8. A network connection method, performed by a to-be-accessed device, wherein the to-be-accessed device is a device to access a network, and the method comprises:

establishing a pre-connection with a terminal, and receiving a first public key sent from the terminal;

generating a second shared key based on the first public key and second key negotiation information;

decrypting encrypted network configuration information by the second shared key to obtain network configuration information of a network device, in a case of receiving the encrypted network configuration information sent from the terminal; wherein the encrypted network configuration information is obtained by the terminal encrypting the network configuration information by a first shared key, the first shared key is the same as the second shared key, and the first shared key is generated by the terminal based on first key pair corresponding to the first public key and first key negotiation information matching to the second key negotiation information; and accessing to the network device based on the network configuration information;

wherein the second key negotiation information is a preset private key, and generating the second shared key based on the first public key and the second key negotiation information, comprises:

generating a second key pair, and sending a second public key of the second key pair to the terminal;

signing the first public key and the second public key by the preset private key to obtain signature information, and sending the signature information to the terminal for the terminal to verify the signature information; and processing a second private key of the second key pair and the first public key by a first encryption algorithm in a case of receiving a verification-passing instruction of the terminal, to generate the second shared key.

9. The method according to claim 8, wherein the second key negotiation information is a preset private key, and generating the second shared key based on the first public key and the second key negotiation information, comprises:

processing the preset private key and the first public key by a first encryption algorithm to generate the second shared key.

10. The method according to claim 8, wherein the number of first public keys is two, the second key negotiation information is a PIN code, and generating the second shared key based on the first public key and the second key negotiation information, comprises:

sharing the PIN code to the terminal based on a preset password-sharing manner;

generating a third key pair, wherein the third key pair comprises two key pairs; and sending third public keys of the third key pair to the terminal, and generating the second shared key based on the PIN code, the third key pair, and the first public key by a second encryption algorithm, wherein the number of the third public keys is two.

11. The method according to claim 8, wherein after generating the second shared key based on the first public key and the second key negotiation information and before decrypting the encrypted network configuration information by the second shared key to obtain the network configuration information of the network device, the method further comprises:

receiving a verifying operation;

wherein decrypting the encrypted network configuration information by the second shared key to obtain the network configuration information of the network device, comprises:

decrypting the encrypted network configuration information by the second shared key to obtain the network configuration information in a case where the verifying operation matches a preset verifying operation.

12. A terminal, comprising:

a first processor;

a first transmitter;

a first receiver;

a first memory; and a first communication bus;

wherein when the first processor executes a program stored in the first memory, the first processor is caused to implement:

establishing a pre-connection with a to-be-accessed device, wherein the to-be-accessed device is a device to access network;

generating a first key pair, and sending a first public key of the first key pair to the to-be-accessed device;

generating a first shared key based on the first key pair and first key negotiation information corresponding to the to-be-accessed device;

encrypting network configuration information of a network device by the first shared key, to obtain encrypted network configuration information; and sending the encrypted network configuration information to the to-be-accessed device, to allow the to-be-accessed device to decrypt the encrypted network configuration information by a second shared key, and access to the network device based on the decrypted network configuration information;

wherein the second shared key is the same as the first shared key, and the second shared key is generated by the to-be-accessed device based on the first public key and second key negotiation information matching to the first key negotiation information;

wherein the first key negotiation information is a preset public key, and the first processor is caused to implement:

receiving a second public key sent from the to-be-accessed device, wherein the second public key is a public key of a second key pair generated by the to-be-accessed device; and receiving signature information sent from the to-be-accessed device, and verifying the signature information by the preset public key, the first public key, and the second public key: wherein the signature information is obtained by the to-be-accessed device signing the first public key and the second public key with a preset private key, and the preset private key is a second key negotiation message matching to the preset public key.

13. The terminal according to claim 12, wherein the first key negotiation information is a preset public key, and the first processor is caused to implement:

processing a first private key of the first key pair and the preset public key by a first encryption algorithm to generate the first shared key.

14. The terminal according to claim 13, the first processor is caused to implement:

acquiring the preset public key from the terminal; and/or receiving a device identification sent from the to-be-accessed device, and receiving the preset public key corresponding to the device identification from a server, wherein the server establishes a communication connection with the terminal.

15. The terminal according to claim 12, wherein the first processor is caused to implement:

sending a verification-passing instruction to the to-be-accessed device, in response to a verification for the signature information being passed, and processing a first private key of the first key pair and the second public key by a first encryption algorithm to generate the first shared key.

16. The terminal according to claim 12, wherein the first key pair comprises two key pairs, the first key negotiation information is a personal identification number (PIN) code, and the first processor is caused to implement:

acquiring the PIN code shared by the to-be-accessed device based on a preset password-sharing manner;

receiving third public keys sent from the to-be-accessed device, wherein the number of the third public keys is two; and generating the first shared key based on the PIN code, the first key pair, and the third public keys by a second encryption algorithm.

17. The terminal according to claim 12, wherein the first processor is caused to implement:

outputting a device-verifying indication for indicating to perform a verifying operation on the to-be-accessed device, to perform a user verification.

* * * * *